(No Model.)
J. G. WIBORGH.
PYROMETER.
No. 489,884.  Patented Jan. 10, 1893.
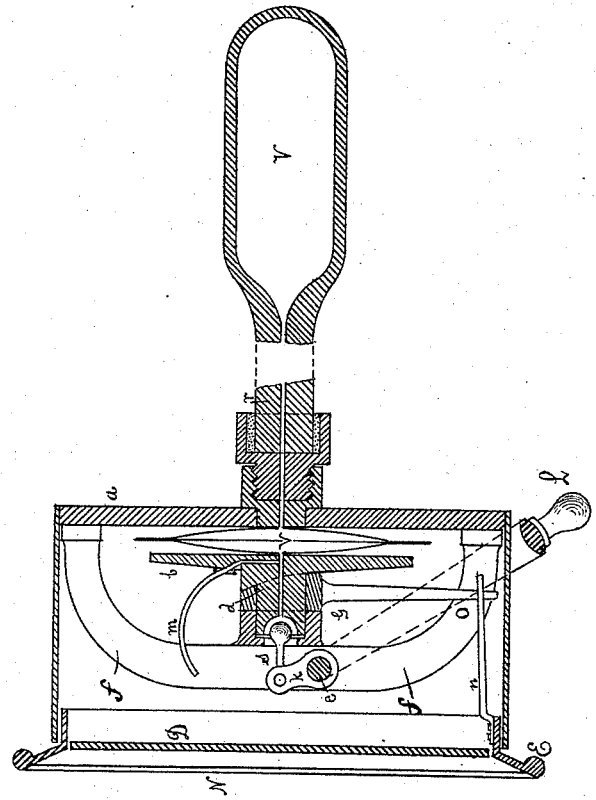
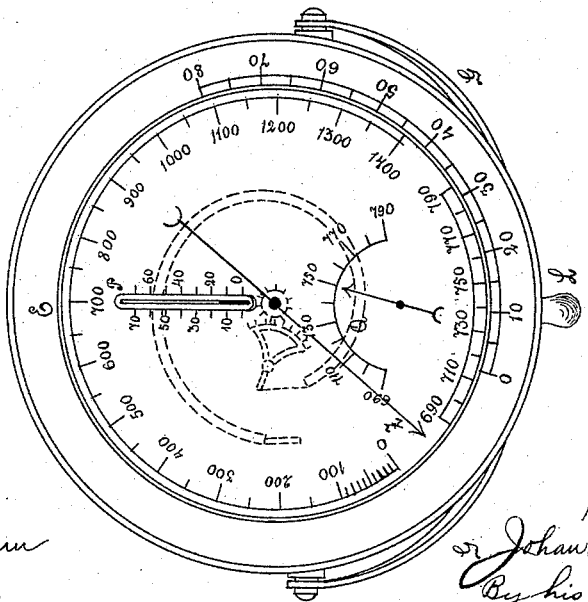
WITNESSES:
George Baumann
James Gracie
INVENTOR.
Johan G. Wiborgh
By his Attorneys
Howson and Howson
THE NORRIS PETERS CO., PHOTO-LITHO., WASHINGTON, D. C.

UNITED STATES PATENT OFFICE.

JOHAN GUSTAF WIBORGH, OF STOCKHOLM, SWEDEN.

PYROMETER.

SPECIFICATION forming part of Letters Patent No. 489,884, dated January 10, 1893.

Application filed October 22, 1892. Serial No. 449,556. (No model.) Patented in Sweden May 4, 1891, No. 3,600.

*To all whom it may concern:*

Be it known that I, JOHAN GUSTAF WIBORGH, a subject of the King of Sweden and Norway, and a resident of Stockholm, in the Kingdom of Sweden, have invented a certain new and useful Apparatus for Determining Temperatures, (for which I have obtained a patent in Sweden, No. 3,600, bearing date May 4, 1891,) of which the following is a specification.

This invention relates to an apparatus for determining temperatures thereby that a volume of air, contained in a thermometer bulb, is exposed to the temperature, which is to be determined, the interior of said bulb being during the exposure in communication with the outer air through a capillary tube; thereupon the communication with the outer air is cut off, and another volume of air of atmospheric pressure and of known temperature, is forced into the volume of heated air in said thermometer bulb, and the power required for this purpose, is measured by means of a common metal-manometer. The necessary corrections in consequence of variations in the barometric pressure and in the temperature of the surrounding air are effected by increasing or decreasing the volume of air which is to be forced into the heated volume of air in the thermometer bulb.

In the accompanying drawings Figure 1 represents the apparatus in front elevation and Fig. 2 is a longitudinal section of the same.

The outer casing of the instrument consists of a metal-box with a solid bottom $a$, Fig. 2. To the bottom $a$ is fixed the pyrometer tube, which consists of the thermometer bulb V, that is to be heated, and the capillary tube $r$ connected thereto. On the same bottom $a$ inside the box is attached a lentiform vessel V' made of brass, electro-plate or other suitable material, and of such form and elasticity that it can be compressed entirely flat and afterward resume its original form. On the opposite side of this vessel is attached a strong plate $b$ of metal provided with a cylindrical projecting piece $d$. The plate $b$ and projecting piece $d$ are pierced by a capillary hole. The lentiform vessel has two openings, corresponding to the capillary hole in the pyrometer tube and to the capillary hole in the projecting piece $d$, in such a manner that the two volumes of air contained in V and V' communicate with the outer air by means of the capillary hole in the projecting piece $d$. At the bottom plate $a$ is secured a strong bow or bridge piece $f$, forming support for a shaft $e$. By turning this shaft the vessel V' can be compressed. For this purpose the shaft $e$ is provided with a short arm $k$ and this arm $k$ with a rod $s$, which, as the shaft is turned, is advanced against the mouth of the capillary hole in $d$ and closes it and in continuing turning the shaft the rod $s$ pushes the plate $b$ against the bottom $a$, and thereby the lentiform vessel V' is compressed in such a manner that the entire quantity of air contained in it is driven into the air in the thermometer bulb V. In order to measure the ensuing pressure the capillary hole in the piece $d$ is connected through a pipe $m$ of lead with a hollow manometer spring, which in the ordinary manner, by means of a lever and gearing (the arrangement shown in dotted lines in Fig. 1) transmits to the index Z the movements of the manometer spring in consequence of the increased pressure of the air. The leaden pipe $m$ must have a bent form and be rather long, because its lower end must follow the movements of the plate $b$. For operating the shaft $e$ it projects through bearings in the walls of the casing, and the two ends are connected outside the casing by a forked lever G provided with a handle or knob L.

When the apparatus is in rest the volumes of air in V and V' ought to communicate with the outer air or atmosphere, and therefore the rod $s$ may not close the mouth of the capillary hole; for that reason the shaft $e$ is connected with a spiral spring (not shown in the drawings), which makes the shaft $e$ and its lever G always automatically resume the position, in which they are represented in Fig. 2.

In order to vary the volume of the vessel V', that is to say the volume of air, which shall be forced into the air in the bulb V, the cylindrical piece $d$ is surrounded by a movable ring $g$ one face of which (in consequence of the elasticity of the vessel V') is kept constantly pressed against the bow $f$, and the other, which is not plain but has the form of a screwthread, against a correspondingly formed part on the plate $b$. When the ring $g$ is rotated the plate $b$ must alter its position in relation to the bottom a, and thus the vessel V', placed between the two, is compressed or dilated, according to the direction in which the ring is rotated. The rotation of the ring g is effected by rotating the lid of the box, which lid consists of a ring E of metal, filled up by a glass-plate N. The two rings g and E are coupled together by means of the arms n and o, the one of which is forked and embraces the other. Inside the glass-plate N is the dial-plate D which is however not fixed to the ring E, but to the bow f (this arrangement is not shown in the drawings), in such a manner that the ring E may be rotated round the fixed dial-plate.

On the dial-plate are drawn the thermometer scale, on which the index Z will point out the temperature T sought (in the drawings graduated from 0° to 1,400° centigrade), and a scale for corrections in consequence of variations in the barometric pressure. This latter scale is placed below, close to the movable ring E and is in Fig. 1 graduated for barometric pressures from six hundred and ninety to seven hundred and ninety millimeters. Further the dial plate is provided with a thermometer P, which gives the temperature of the air which is to be driven into the air in the bulb V, and with an aneroid barometer Q. On the ring E is drawn a scale for correction in consequence of variations in the temperature of the surrounding air and graduated in such a manner, that if the ring be rotated so much as from $0^0$ to $t^0$ on said scale, the volume of V' will at the same time ncrease from V' to V' $(1+a\,t)$, $a$ being the coefficient of dilatation of the air. After this scale the above mentioned scale for barometric pressures on the dial-plate is graduated in such a manner that a difference of seventy-eight millimeters in barometric pressure corresponds to 50° centigrade on the thermometer scale of the ring. If the instrument is rightly adjusted, that is to say if the vessel V' has its smallest volume when the ring is so turned that 0° on the thermometer coincides with the highest barometric pressure on the scale on the dial-plate, the device just described makes a complete correction for barometric pressure and surrounding temperature and it is only necessary to turn the ring E before an observation in such a manner that the temperature and the barometric pressure, indicated by the thermometer and the barometer on the dial-plate, are placed just opposite each other on the two above mentioned scales on the ring E and on the dial-plate, and the instrument will directly and without any calculations point out the right temperature T. When no determination of temperature is taken the index Z stands a little below the point of zero of the scale, which it ought to do, because a certain pressure is wanted to force the volume of air V' into the air in V, even if these (V' and V) have the same temperature and thus the index must always rise a little. If an observation of temperature shall be made the ring E is, as above set forth, put in the right position, then the knob L is seized with the forefinger and the thumb laid on the glass-plate N and the knob is drawn steadily forward as far as possible. In pulling forward the knob L the rods is pressed down and closes the capillary hole in the projecting piece d and pushes it down together with the plate b and said plate presses entirely together the metal vessel V', the volume of air contained therein is forced through the capillary tube r and into the air in thermometer bulb V, and the higher this bulb is heated, the higher pressure is wanted for forcing in the air. This pressure is through the lead-pipe m imparted to the manometer spring, and its changes of form are in the common way transmitted to the index Z, which mounts and stops at the number of degrees on the scale which corresponds to the temperature T of the thermometer bulb. As soon as the temperature is read, the knob L is released, and springs directly back, in consequence of the action of the spring wound round the shaft e and the elasticity of the metal vessel V' at the same time the index Z descends again to its original position. The observation is made in a few seconds and any person can make it.

I claim:—

In apparatus for determining temperatures the combination of the thermometer bulb V and capillary tube r with a vessel V' of resilient material communicating with the outer air and with a manometer spring connected with an index pointing out the temperature on the scale, devices for compressing said vessel V' and closing its communication with the outer air and devices for adjusting the capacity of said vessel in order to effect the necessary correction in consequence of variations in the barometric pressure and in the temperature of the surrounding air, substantially as set forth.

In testimony whereof I have signed my name to this specification in the presence of two subscribing witnesses.

JOHAN GUSTAF WIBORGH.

Witnesses:
 CARL GESELL,
 L. ENGLUND.